United States Patent
Suh (10) Patent No.: US 7,644,426 B2
(45) Date of Patent: Jan. 5, 2010

(54) METHOD FOR IMPLEMENTING HELP FUNCTION IN DIGITAL TV RECEIVER

(75) Inventor: Ji Sim Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 1251 days.

(21) Appl. No.: 10/020,162

(22) Filed: Dec. 18, 2001

(65) Prior Publication Data

US 2002/0075415 A1 Jun. 20, 2002

(30) Foreign Application Priority Data

Dec. 18, 2000 (KR) ............................... 2000-78049

(51) Int. Cl.
*G06F 3/00* (2006.01)
*H04N 5/445* (2006.01)
(52) U.S. Cl. ....................... 725/43; 725/44; 715/708; 715/714
(58) Field of Classification Search ................ 725/139, 725/131, 151, 43, 44; 715/708, 711, 714, 715/715

See application file for complete search history.

(56) References Cited

U.S. PATENT DOCUMENTS

| 5,517,257 | A | * | 5/1996 | Dunn et al. ................. 348/734 |
| 5,714,971 | A | * | 2/1998 | Shalit et al. ................. 715/804 |
| 5,822,123 | A | * | 10/1998 | Davis et al. ................... 725/43 |
| 5,933,137 | A | * | 8/1999 | Anderson .................... 715/720 |
| 5,936,611 | A | * | 8/1999 | Yoshida ....................... 345/158 |
| 6,016,136 | A | * | 1/2000 | Fado et al. ................... 715/721 |
| 6,182,287 | B1 | * | 1/2001 | Schneidewend et al. ....... 725/48 |
| 6,412,110 | B1 | * | 6/2002 | Schein et al. ................. 725/40 |
| 6,467,081 | B2 | * | 10/2002 | Vaidyanathan et al. ...... 717/123 |
| 6,691,282 | B1 | * | 2/2004 | Rochford et al. ............ 715/234 |
| 6,829,779 | B1 | * | 12/2004 | Perlman ....................... 725/37 |
| 6,879,350 | B2 | * | 4/2005 | Kwon et al. ................. 348/569 |
| 6,978,473 | B1 | * | 12/2005 | Nsonwu et al. ............... 725/52 |

(Continued)

FOREIGN PATENT DOCUMENTS

GB 2 354 142 A 3/2001

(Continued)

OTHER PUBLICATIONS

Amstrad, "Using Your Sky Digibox," British Sky Boradcasting, Nov. 1998. pp. ii, 1-41.*

(Continued)

*Primary Examiner*—John W Miller
*Assistant Examiner*—Chris Parry
(74) *Attorney, Agent, or Firm*—Birch, Stewart, Kolasch & Birch, LLP (57) ABSTRACT

A method for implementing a help function in a digital television receiver is disclosed, wherein main help items including titles of external elements such as a rear panel and a front panel are displayed on a screen if a user pushes a help button of a remote controller or main body. When one of the main help items is selected, a configuration (or figure) of the selected main help item is displayed, and the user can indicate a desired part of the configuration by manipulating buttons of the remote controller and the main body. A help description of the indicated part is displayed on the screen together with it's configuration.

22 Claims, 8 Drawing Sheets

U.S. PATENT DOCUMENTS 6,985,190 B1 * 1/2006 Klopfenstein et al. ....... 348/569
7,043,691 B1 * 5/2006 Kwon et al. ................ 715/705

FOREIGN PATENT DOCUMENTS

GB 2 359 714 A 8/2001

OTHER PUBLICATIONS http://www.brown.edu/Facilities/CIS/Communications/catv/catvtrubanswrs.html Brown University, Cable Television at Brown University, Sep. 9, 2002.

* cited by examiner

METHOD FOR IMPLEMENTING HELP FUNCTION IN DIGITAL TV RECEIVER

This application claims the benefit of the Korean Application No. P2000-78049 filed on Dec. 18, 2000, which is hereby incorporated by reference.

BACKGROUND OF THE INVENTION

1. Field of the Invention

The present invention relates to a method for implementing a help function of an OSD menu in a digital television receiver.

2. Discussion of the Related Art

Generally, a digital television receiver has an on screen display (OSD) menu function. With the trend of a complicated structure and function of the digital television receiver, its description is required. Most of the description of the structure and function of the digital television receiver is provided in a manual type. Since the OSD function can allow a user to more conveniently implement a desired function, it is a general tendency that the OSD function rather than the manual type is used. In other words, the user can use a help function of a desired item on the OSD of a screen without checking the manual.

Related art technologies for displaying a help description of a desired menu on a screen of a display device will now be described.

In the most general display method, the OSD menu is displayed. Whenever one item of the OSD menu is indicated by a cursor, a corresponding help description is always displayed on some area of the screen. However, in this method, titles and help descriptions of external elements of the digital television receiver are only displayed on the screen. That is, configurations of the external elements are not displayed on the screen. Recently, with increase of the complexity of the digital television receiver, a method for installing, setting, and using the receiver has become also complicated. Moreover, it was difficult for the users to understand detailed parts of the external elements consisting of complicated terminals and pins such as rear and front panels, with only a brief description of a conventional help function.

According to another related art method, an on/off function serves to display and erase the help description on the screen through the OSD menu area. At this time, if an on function of the help description is implemented on the OSD menu, the help description is always displayed on a partial area of the screen. As the screen is partially covered, the user cannot view a partial area of the displayed program. For this reason, the description of installation, setting, and external appearance of equipments not included in the OSD menu and the description of buttons of a remote controller had to depend on the manual.

According to other related art, the help description is provided independently from the OSD menu area. In this case, if the user implements the help-on function, the whole screen including the displayed program screen and the OSD menu area is completely covered with the help description. Therefore, the user cannot view a desired help description while implementing the OSD menu function. Also, since the help description is no more than a brief description of the whole function of the external elements, it was difficult for the users to exactly understand a function of each external element.

SUMMARY OF THE INVENTION

Accordingly, the present invention is directed to a method for implementing a help function in a digital television receiver that substantially obviates one or more problems due to limitations and disadvantages of the related art.

An object of the present invention is to provide a method for implementing a help function in a digital television receiver in which configurations of external elements can be provided together with their help description.

Another object of the present invention is to provide a method for implementing a help function in a digital television receiver, in which a help description of a detailed part of each external element can be provided on a screen together with a configuration of the external element.

Other object of the present invention is to provide a method for implementing a help function in a digital television receiver, in which the help function can simply be implemented on a screen when a user desires.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, main help items are displayed on a first area of a screen if a user selects a help item among OSD menu items to use an OSD menu function by manipulating a remote controller in a digital television receiver. If the user selects a main help item corresponding to a title of one external element, a detailed configuration of the external element is displayed on a second area of the screen. In this case, whenever the user selects detailed parts of the configuration of the external element, their descriptions are displayed on a third area of the screen. In other words, a description of setting the digital television receiver, a description of a function of a remote controller, a description of detailed parts of external elements in the digital television receiver, and a help description of various menus on OSD are displayed on an OSD screen in figure and text types. Also, the user can indicate a desired part on the figure and text using buttons of the remote controller and can interactively view a help description of the desired part together with the figure. Since the figure(or configuration) is displayed together with the help description, the user can easily implement the help function. The first to third areas are independently displayed on one screen without being overlapped with one another.

In another aspect of the present invention, the help descriptions of the parts of each external element displayed on the screen are displayed while the user pushes help button of the remote controller and a main body. If the user releases the help button, the help descriptions are disappeared from the screen. Also, the help descriptions are displayed on the screen using the help button or may be disappeared from the screen by pushing buttons other than the help button. The parts of each element include terminals and pins.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A digital television receiver for explaining a method according to the present invention will be described with reference to FIG. 1.

Figure 1:
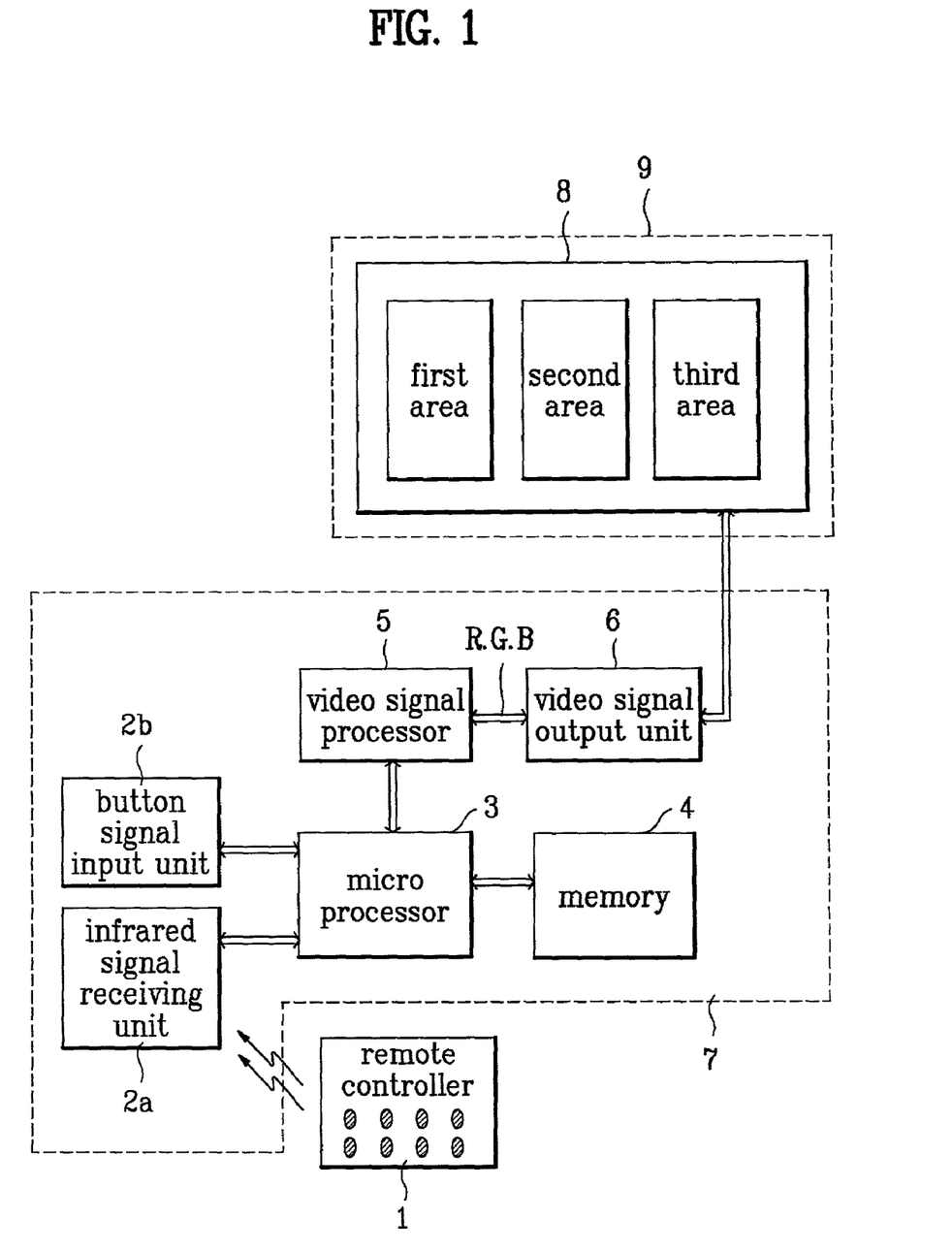
FIG. 1 is a block diagram illustrating a digital television receiver to explain a method according to the present invention.

Referring to FIG. 1, the digital television receiver includes a remote controller 1, an infrared signal receiving unit 2a, a button signal input unit 2b, a microprocessor 3, a memory 4, a video signal processor 5, a video signal output unit 6, and a display device 9. A reference numeral 8 denotes a screen of the display device 9, and a reference numeral 7 denotes a main body of the digital television receiver.

The remote controller 1 includes various buttons including a help button and transmits an infrared signal (or remote control signal) corresponding to a button pushed by a user to the main body of the digital television receiver.

The infrared signal receiving unit 2a receives the infrared signal from the remote controller 1 and converts the infrared signal to a voltage signal than can be recognized by the microprocessor 3. The microprocessor 3 reads the voltage signal and implements control corresponding to the read result.

Meanwhile, the button signal input unit 2b converts key signals from buttons formed on a front panel of the main body 7 to a voltage signal that can be recognized by the microprocessor 3. Then, the button signal input unit 2b outputs the voltage signal to the microprocessor 3. That is, the infrared signal receiving unit 2a processes a radio signal while the button signal input unit 2b processes a cable signal.

The memory 4 stores various data including an OSD menu and help information and provides required display data to the display device 9 through the microprocessor 3 under the control of the microprocessor 3.

The display device 9 displays the data from the memory 4 on the screen 5.

The video signal processor 5 processes the display data input from the memory 4 through the microprocessor 3, and the video signal output unit 6 provides the processed display data to the display device 9 in red(R), green(G), and blue(B) signal types.

Figure 2:
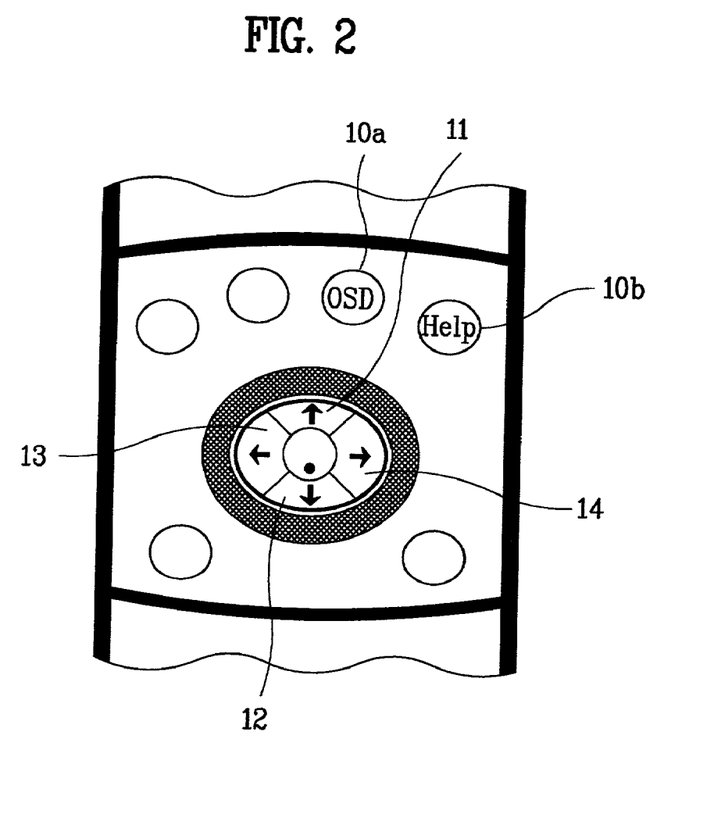
FIG. 2 is a block diagram illustrating a panel of a remote controller for the digital television receiver to explain the method according to the present invention.

Referring to FIG. 2, a button 10a denotes an OSD function button that instructs implementation of the OSD function, and a button 10b denotes a help button that instructs implementation of the help function. A button 11 serves to move a cursor on the screen 8 upwardly by means of manipulation of the user, and a button 12 serves to move the cursor downwardly. A button 13 serves to move the cursor left, and a button 14 serves to move the cursor right.

Figure 3:
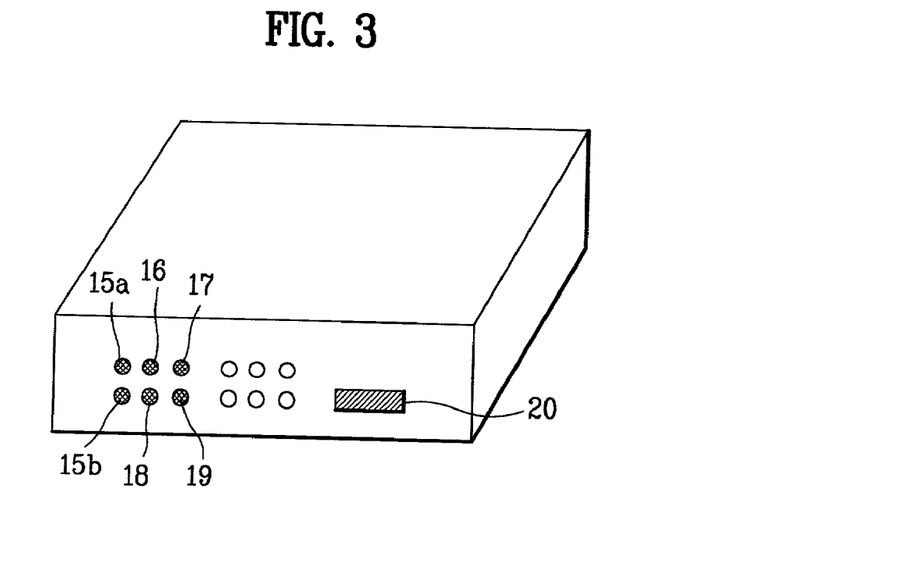
FIG. 3 is a diagram illustrating buttons installed in a front panel of a main body in the digital television receiver to explain the method according to the present invention.

Referring to FIG. 3, the OSD function button is denoted by a reference numeral 15a, and the help button by a reference numeral 15b. A reference numeral 16 denotes a button that serves to move the cursor on the screen 8 upwardly by manipulation of the user, and a reference numeral 17 denotes a button that serves to move the cursor downwardly. A reference numeral 18 denotes a button that serves to move the cursor left, and a reference numeral 19 denotes a button that serves to move the cursor right. Meanwhile, in addition to the above buttons denoted by the particular reference numerals, as shown in FIGS. 2 and 3, the main body and the remote controller of the digital television receiver can have a plurality of function buttons not denoted by particular reference numerals.

Figure 4A:
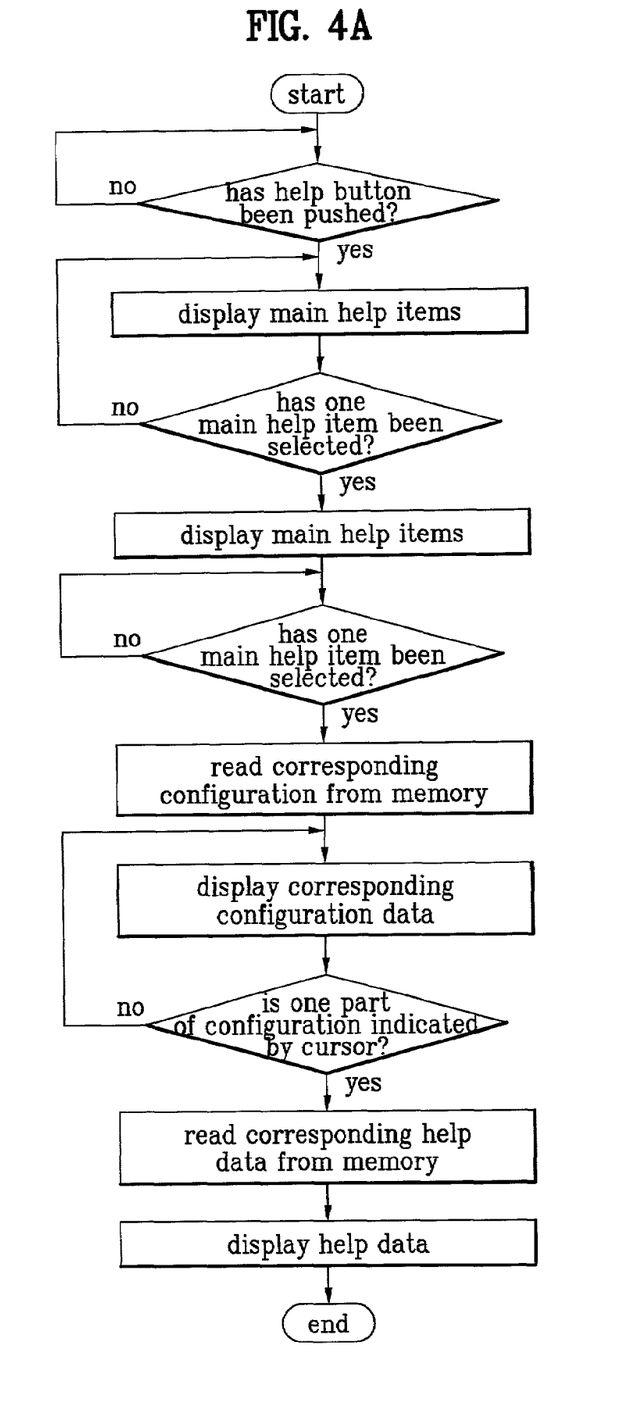
FIG. 4A is a diagram illustrating a system program for implementing a help function according to the first embodiment of the present invention.

A system program for implementing a help function according to the first embodiment of the present invention will be described with reference to FIG. 4A.

As described above, the OSD function button, the help function button, and the cursor button are respectively provided on the main body and the remote controller. For the convenience, the buttons on the remote controller will be described below.

First, if the user pushes any one of the buttons on the remote controller 1, a corresponding key code value is transmitted to the main body 7 in an infrared signal type. The infrared signal receiving unit 2a of the main body 7 processes the key code value and then transmits it to the microprocessor 3. The microprocessor 3 implements a required function on a previously displayed program screen of the display device 9 in response to the key code value. When the user pushes a help button 10b of FIG. 2, the microprocessor 3 reads data of main help items from the memory 4 and the video signal processor 5 processes a required video signal on the read data. The processed data is displayed by the microprocessor 3 on the screen 8 through the video signal output unit 6.

For example, the user can move a cursor or icon to designate a required item or configuration on the screen 8 by pushing the cursor buttons 11, 12, 13, and 14 of the remote controller 1 shown in FIG. 2.

The method according to the first embodiment of the present invention will be described with reference to FIG. 4A.

As described above, once the user pushes the help button 10b of the main body 7 or the remote controller 1, the main help items including titles of the external elements are read from the memory 4 under the control of the microprocessor 3. The read main help items are displayed within a first area of the screen.

As shown in FIG. 1, the first area may be located at the outmost left side of the screen.

Subsequently, once the cursor indicates a title of one external element among titles of the external elements and the other functional main help items as the user manipulates the cursor buttons 11~14, the microprocessor 3 displays a detailed configuration of the external element indicated by the cursor on a second area of the screen 8. As shown in FIG. 1, the second area may be located at the center of the screen.

Subsequently, once the cursor indicates any one (terminal or pin) of the detailed configuration of the displayed element as the user manipulates the cursor buttons 11~14, the microprocessor 3 reads the help description of the indicated one from the memory 4 and displays the read help description in a third area at the outmost right side of the screen 8.

In the first embodiment of the present invention, when the cursor indicates any one part of the configuration of the displayed element, the microprocessor 3, as shown in FIG. 1, directly accesses the help description of the indicated part without inputting a separate key signal (without pushing an arbitrary button). The accessed data can be displayed on the third area of the screen 8 as the help description of the indicated part.

The help description of each part displayed on the third area is disappeared from the screen when the user pushes one of the buttons 10~20 including the help button 10b. The description displayed on the first and second areas can only remain on the screen.

Also, when the user allows the cursor to newly indicate one item among the main help items of the first area using the cursor buttons 11~14, a configuration of the newly indicated main help item is displayed on the screen 8 and the third area remains in a blank state.

The help description of the indicated part can be displayed on the third area of the screen 8 only if the user pushes the help button 10b again in a state where the cursor indicates any one part of the configuration of the displayed element. When the user pushes the help button 10b again and then releases it, the help description of the third area is disappeared from the screen while the descriptions of the first and second areas can remain on the screen 8.

Furthermore, the help description of the indicated part can be displayed on the third area of the screen 8 only if the user pushes any one other than the help buttons 10b and 15b among the buttons 10~20 in a state where the cursor indicates one part of the configuration of the displayed element. The help description of the third area is disappeared from the screen when the user pushes any one other than the help buttons 10b and 15b while the help descriptions of the first and second areas can remain on the screen.

Figure 4B:
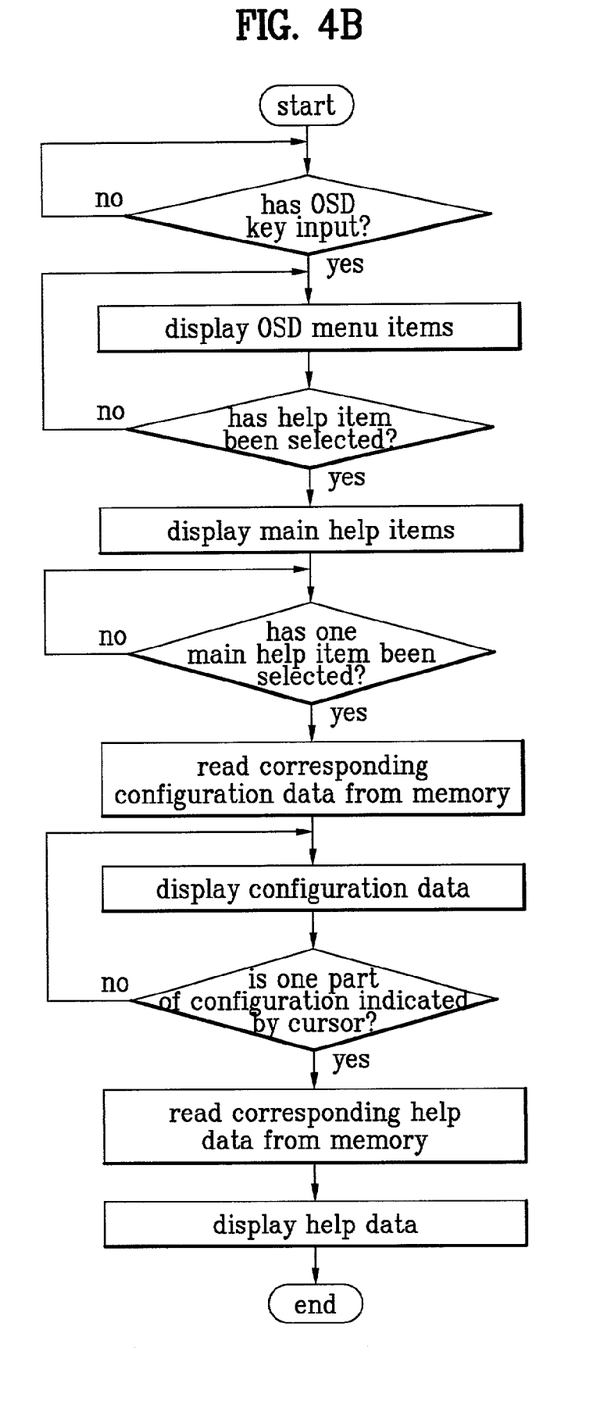
FIG. 4B is a flow chart illustrating a system program for implementing a help function according to the second embodiment of the present invention.

The method according to the second embodiment of the present invention will be described with reference to FIG. 4B.

Once the user pushes the OSD buttons 10a and 15a, the microprocessor 3 reads OSD menu items including a help item from the memory 4 and displays the read OSD menu items on the screen 8. Subsequently, when the user allows the cursor to indicate the help item among the OSD menu items using the cursor buttons 11~14 and 16~19, the microprocessor 3 reads the main help items including titles of the external elements of the digital television receiver from the memory 4 and displays the read main help items on the first area of the screen 8.

Once the user allows the cursor to indicate any one part (terminal or pin) of the detailed configuration of the displayed element using the cursor buttons 11~14 and 16~19, the microprocessor 3 reads the help description of the indicated part from the memory 4 and displays the read help description on the third area at the outmost right side of the screen 8.

In the second embodiment of the present invention, when the cursor indicates the help item among the OSD menu items, the microprocessor 3 can display the main help items on the first area of the screen 8 without a separate key signal. Also, when the user pushes any one of the buttons 10~20 including the help buttons 10b and 15b, the microprocessor 3 can disappear the main help items displayed on the first area from the screen.

The microprocessor 3 can display the main help items only if the user pushes the help buttons 10b and 15b in a state where the cursor indicates the help item among the OSD menu items displayed on the screen 8. The microprocessor 3 also can display the main help items on the first area of the screen 8 while the user pushes the help buttons 10b and 15b. When the user releases the help buttons 10b and 15b, the microprocessor 3 can disappear the main help items of the first area from the screen and can maintain the displayed OSD menu items only on the screen 8.

Furthermore, the microprocessor 3 can display the main help items on the first area of the screen 8 only if the user pushes any one other than the help buttons 10b and 15b among the buttons 10~20 in a state where the cursor indicates the help item among the OSD menu items. The microprocessor 3 can disappear the main help items displayed on the first area of the screen 8 and can maintain the OSD menu items on the screen 8 when the user pushes any one other than the help buttons 10b and 15b.

As described above, the buttons including the OSD button, the help button, and the cursor buttons are provided on both the front panel of the main body 7 and the front panel of the remote controller 1. Since the configuration of each element should be displayed on the screen together with its help description, the first to third areas are independently displayed on the screen 8 without any overlap.

Figure 5:
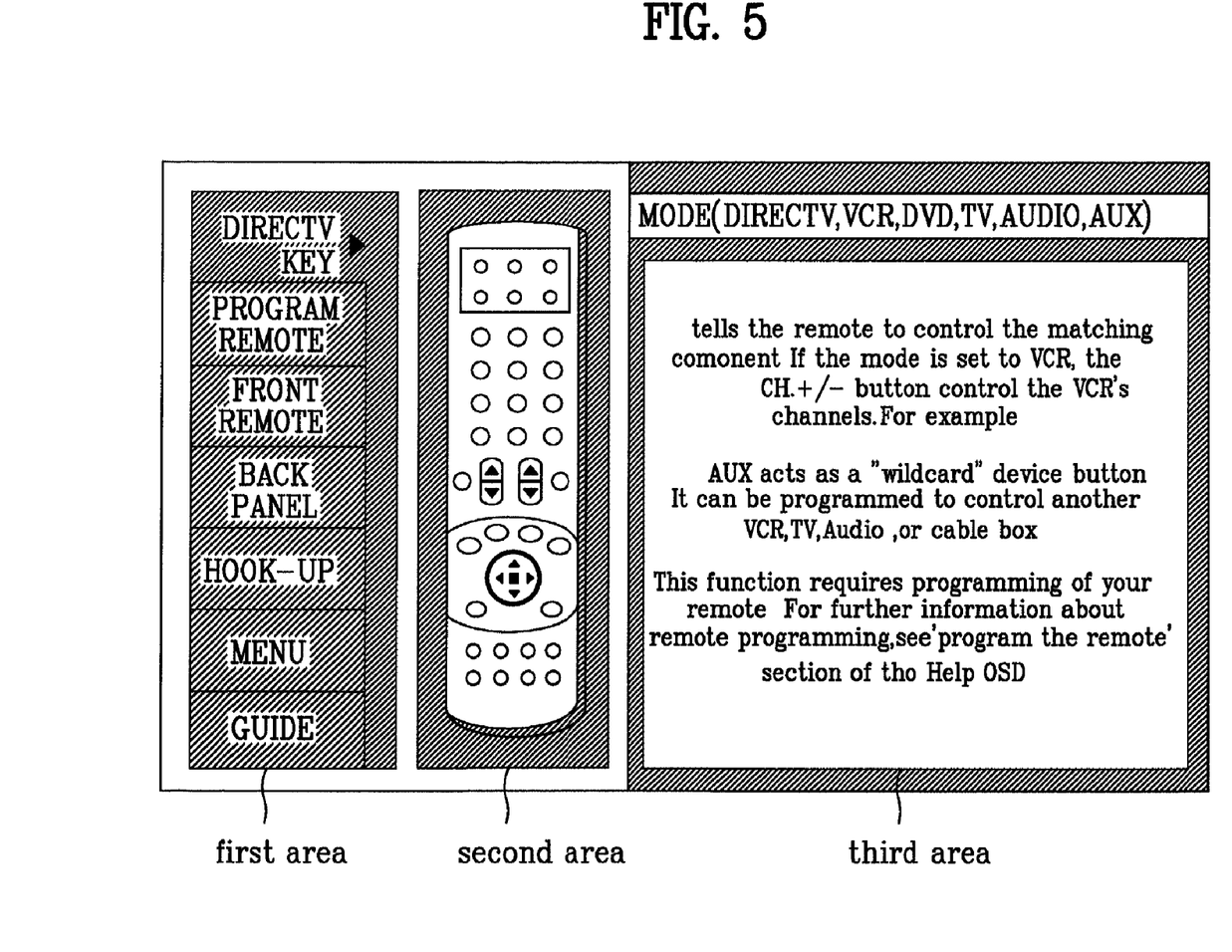
FIG. 5 is a diagram illustrating a screen when a remote key is selected by a user among main help items and a mode button is selected on a remote controller.

FIG. 5 is a diagram illustrating a screen which displays a help description of a mode button on the third area when a remote key is selected by the user among the main help items of the first area and the mode button is selected on the remote controller of the second area.

Figure 6:
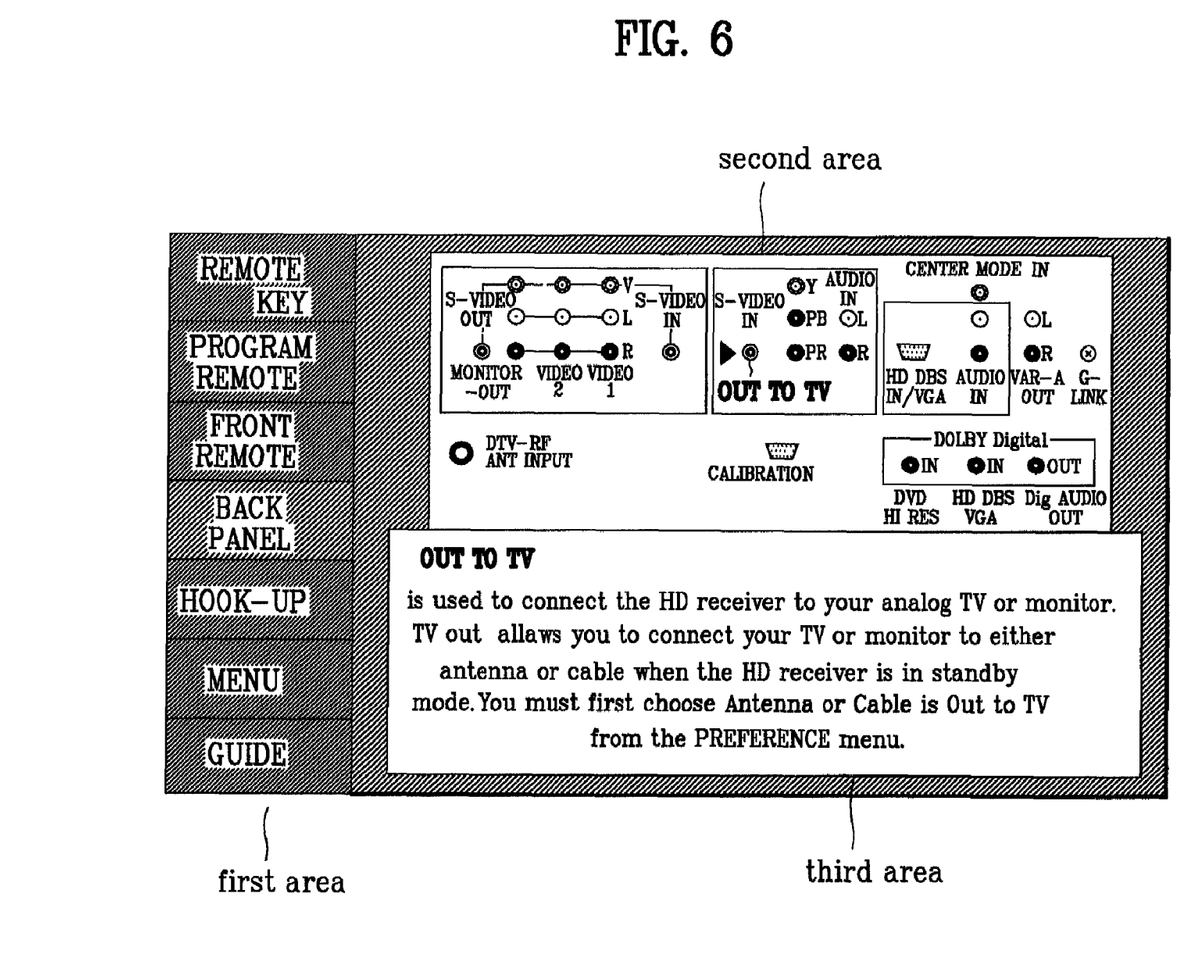
FIG. 6 is a diagram illustrating a screen when a rear panel is selected by a user among main help items and "OUT TO TV" terminal is selected on the rear panel.

FIG. 6 is a diagram illustrating a screen which displays a help description of "OUT TO TV" terminal on the third area when a rear panel is selected by the user among the main help items of the first area and the "OUT TO TV" terminal is selected on a configuration of a rear panel of the second area.

Figure 7:
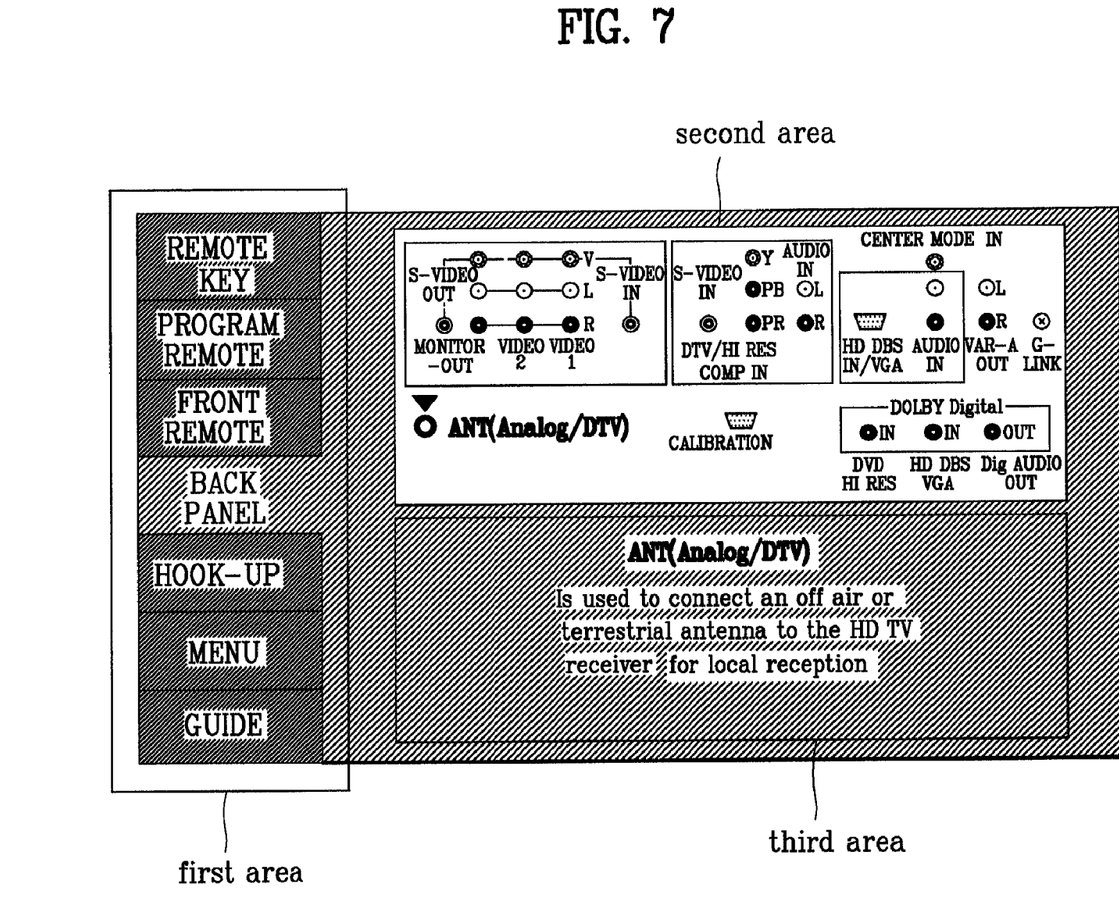
FIG. 7 is a diagram illustrating a screen when a rear panel is selected by a user among main help items and "ANT" terminal is selected on the rear panel.

FIG. 7 is a diagram illustrating a screen which displays a help description of "ANT" terminal on the third area when the rear panel is selected by the user among the main help items and the "ANT" terminal is selected on the configuration of the rear panel of the second area.

Figure 8:
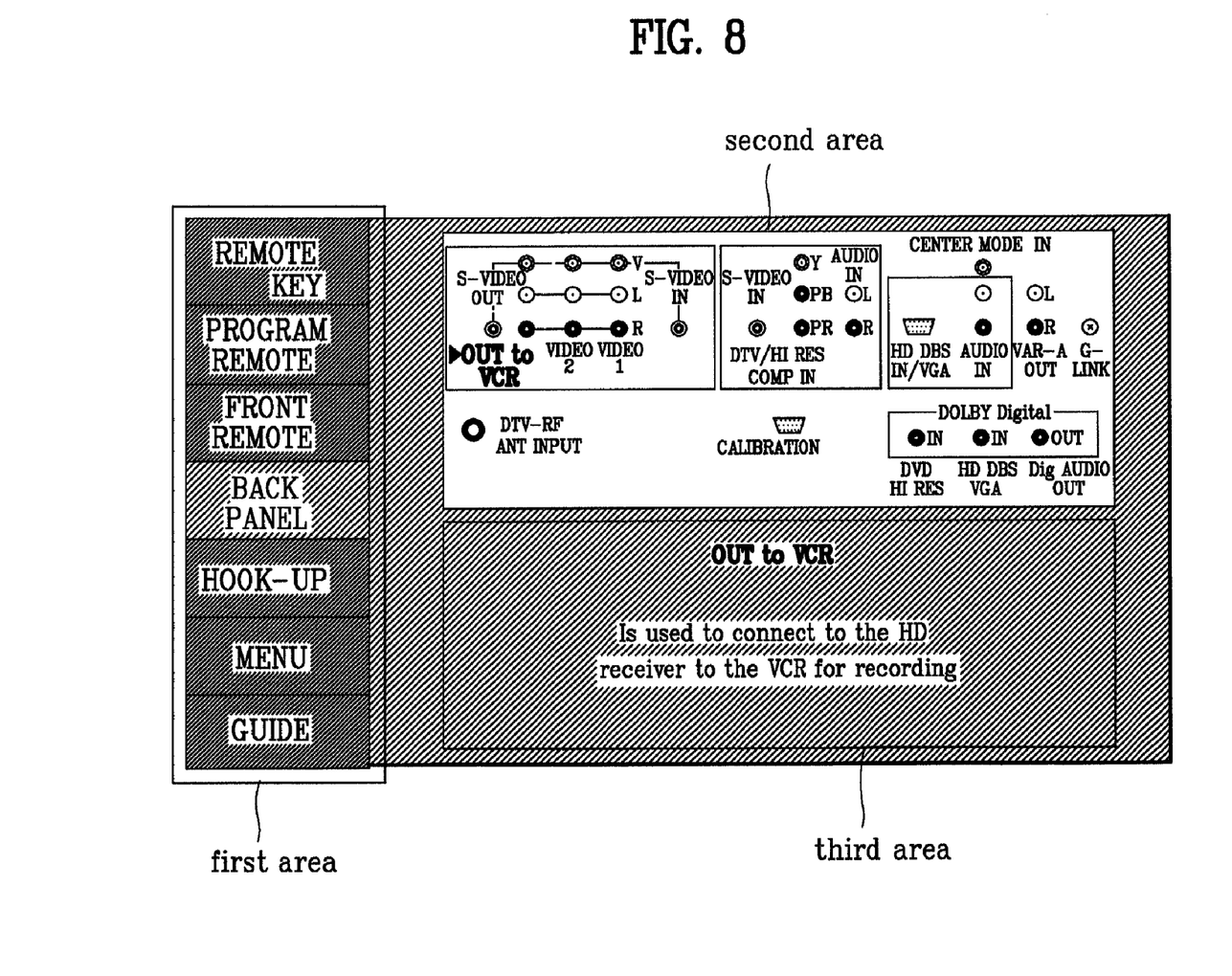
FIG. 8 is a diagram illustrating a screen when a rear panel is selected by a user among main help items and "OUT TO VCR" terminal is selected on the rear panel.

FIG. 8 is a diagram illustrating a screen when the rear panel is selected by the user among the main help items of the first area and the "OUT TO VCR" terminal is selected on the rear panel of the second area.

Referring to FIGS. 5 to 8, the first area may be located at the left side of the screen 8, the second area at a top portion of the right side of the screen 8, and the third area at a bottom portion of the right side of the screen 8.

As shown in FIGS. 5 to 8, examples of the main help items displayed on the first area of the screen 8 include a remote key, a program remote, a front panel, a rear panel, a hook up, a menu, and a guide. Also, the parts of the configuration of each element on the third area include the front panel, the rear panel, and the buttons and the terminals on the remote controller.

As described above, the method for implementing a help function in a digital television receiver has the following advantages.

Since the user can display configurations of detailed parts of external elements on one screen together with their help description, the user can exactly and easily understand functions of the elements.

Furthermore, since the help description can be displayed and erased when the user desires, it does not limit an area of the screen in displaying the OSD menu and the configurations of the external elements.

Moreover, a large quantity of the help description can effectively be displayed on the limited OSD screen using a tab type menu system.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method for implementing a help function in a digital television receiver with a plurality of buttons, including a help button and cursor buttons, provided on the digital television receiver or on a remote controller, the method comprising the steps of:
    displaying main help items including titles of external elements in the digital television receiver on a first area of a screen when a user pushes the help button;
    indicating any one of the titles of the external elements with a cursor as the user manipulates the cursor buttons, and displaying a figure of the external element indicated by the cursor on a second area of the screen; and
    displaying on a third area of the screen a help description with respect to one of plural parts of the figure indicated by the cursor on the second area of the screen without a separate key signal,
    wherein the first, second and third areas are simultaneously displayed on the screen,
    wherein the help description of the third area is removed from the screen when the cursor indicates another part of the figure, and
    wherein the main help items displayed on the first area include a remote key, a program remote, a front panel, a rear panel, a hook up, a menu, and a guide.

2. The method of claim 1, wherein the help description displayed on the third area is removed from the screen while the descriptions on the first and second areas remain on the screen, when the user pushes any one of the buttons including the help button.

3. The method of claim 1, wherein the help description is displayed on the third area of the screen only if the user pushes the help button again in a state where the cursor indicates any one of the plural parts of the figure.

4. The method of claim 3, wherein the help description of the third area is removed from the screen while the help descriptions of the first and second areas remain on the screen, when the user pushes the help button again and then releases it.

5. The method of claim 1, wherein the help description is displayed on the third area of the screen only if the user pushes any one other than the help button among the plurality of buttons in a state where the cursor indicates any one of the plural parts of the figure.

6. The method of claim 5, wherein the help description of the third area is removed from the screen when the user pushes any button other than the help button, and help descriptions of the first and second areas only remain on the screen.

7. The method of claim 1, further comprising the steps of:
    displaying OSD menu items including an help item on the screen when the user pushes an OSD button; and
    displaying main help items including titles of the external elements in the digital television receiver on the first area when the cursor indicates the help item among the OSD menu items as the user manipulates the cursor buttons.

8. The method of claim 7, wherein the main help items of the first area are displayed on the screen without a separate key signal when the cursor indicates the help item among the OSD menu items.

9. The method of claim 8, wherein the main help items displayed on the first area are removed from the screen when the user pushes any one of the plurality of buttons including the help button.

10. The method of claim 7, wherein the main help items are displayed on the first area of the screen only if the user pushes the help button in a state where the cursor indicates the help item among the OSD menu items displayed on the screen.

11. The method of claim 10, wherein the main help items of the first area are displayed on the screen while the user pushes the help button, and the main help items of the first area are removed from the screen when the user releases the help button, so that the OSD menu items only remain on the screen.

12. The method of claim 7, wherein the main help items of the first area are displayed on the screen only if the user pushes any one other than the help button among the plurality of buttons in a state where the cursor indicates the help item.

13. The method of claim 12, wherein the main help items of the first area are removed from the screen and the OSD menu items only remain on the screen, when the user pushes any button other than the help button among the plurality of buttons.

14. The method of claim 1, wherein the plurality of buttons including the OSD button, the help button, and the cursor buttons are formed on a front panel of a main body in the digital television receiver.

15. The method of claim 1, wherein the plurality of buttons including the OSD button, the help button, and the cursor buttons are formed on a front panel of remote controller for the digital television receiver.

16. The method of claim 1, wherein the first to the third areas are independently displayed on the screen without being overlapped with one another.

17. The method of claim 1, wherein the plural parts of the figure include a front panel, a rear panel, and buttons and terminals on a remote controller.

18. A digital television, comprising:
    a display screen;
    a controller operatively connected to the display screen, the controller configured to
        control the display screen to display main help items including titles of external elements in the digital television on a first area of the display screen when a user pushes a help button on a remote device or on the digital television;
        control the display screen to indicate any one of the titles of the external elements with a cursor as the user manipulates cursor buttons on the remote device or on the digital television, and displaying a figure of the external element indicated by the cursor on a second area of the display screen; and control the display screen to display on a third area of the display screen a help description with respect to one part of the figure indicated by the cursor on the second area of the display screen without a separate key signal, wherein the first, second and third areas are simultaneously displayed on the display screen, wherein the help description of the third area is removed from the screen when the cursor indicates another part of the figure, and wherein the main help items displayed on the first area include a remote key, a program remote, a front panel, a rear panel, a hook up, a menu, and a guide.

19. A method for implementing a help function in a digital television receiver with a remote controller, the method comprising the steps of:

displaying main help items including titles of external elements in the digital television receiver on a first area of a screen on a user demand;

indicating any one of the titles of the external elements with a cursor by a user, and displaying a figure of the external element indicated by the cursor on a second area of the screen; and displaying on a third area of the screen information with respect to one part of the figure indicated by the cursor on the second area of the screen, wherein the first, second and third areas are simultaneously displayed on the screen, wherein the information of the third area is removed from the screen when the cursor indicates another part of the figure, and wherein the main help items displayed on the first area include a remote key, a program remote, a front panel, a rear panel, a hook up, a menu, and a guide.

20. A method for implementing a help function in a digital television receiver with a remote controller, the method comprising the steps of:

displaying main help items including titles of external elements in the digital television receiver on a first area of a screen on a user demand;

indicating any one of the titles of the external elements with a cursor by a user, and displaying a figure of the external element indicated by the cursor on a second area of the screen; and displaying on a third area of the screen information with respect to one part of the figure indicated by the cursor on the second area of the screen, wherein the first, second and third areas are simultaneously displayed on the screen, wherein the information of the third area is removed from the screen when the cursor indicates another part of the figure, and wherein the main help items displayed on the first area include a remote key, a program remote, a front panel, a rear panel, a hook up, a menu, and a guide.

21. A digital television, comprising:

a display screen;

a controller operatively connected to the display screen, the controller configured to control the display screen to display main help items including titles of external elements in the digital television on a first area of the display screen on a user demand;

control the display screen to indicate any one of the titles of the external elements with a cursor by a user, and display a figure of the external element indicated by the cursor on a second area of the display screen; and control the display screen to display on a third area of the display screen information with respect to one part of the figure indicated by the cursor on the second area of the display screen, wherein the first, second and third areas are simultaneously displayed on the display screen, wherein the information of the third area is removed from the screen when the cursor indicates another part of the figure, and wherein the main help items displayed on the first area include a remote key, a program remote, a front panel, a rear panel, a hook up, a menu, and a guide.

22. A digital television, comprising:

a display screen;

a controller operatively connected to the display screen, the controller configured to control the display screen to display main help items including titles of external elements in the digital television on a first area of the display screen on a user demand;

control the display screen to indicate any one of the titles of the external elements with a cursor by a user, and display a figure of the external element indicated by the cursor on a second area of the display screen; and control the display screen to display on a third area of the display screen information with respect to one part of the figure indicated by the cursor on the second area of the display screen, wherein the first, second and third areas are simultaneously displayed on the display screen, wherein the information of the third area is removed from the screen when the cursor indicates another part of the figure, and wherein the main help items displayed on the first area include a remote key, a program remote, a front panel, a rear panel, a hook up, a menu, and a guide.

* * * * *